United States Patent [19]

Brunner

[11] Patent Number: 4,516,750
[45] Date of Patent: May 14, 1985

[54] MEANS FOR SUSPENDING PIPEWORK

[75] Inventor: Alfred Brunner, Winterthur, Switzerland

[73] Assignee: Sulzer Brothers Limited, Winterthur, Switzerland

[21] Appl. No.: 335,455

[22] Filed: Dec. 29, 1981

[30] Foreign Application Priority Data

Jan. 8, 1981 [CH] Switzerland .............................. 83/81

[51] Int. Cl.³ ............................................... F16L 3/00
[52] U.S. Cl. .................... 248/58; 248/DIG. 1
[58] Field of Search ................... 248/DIG. 1, 58, 317, 248/59, 62, 63, 74, 49; 52/39, 484, 485; 285/64, 61

[56] References Cited

U.S. PATENT DOCUMENTS

| | | | |
|---|---|---|---|
| 602,517 | 4/1898 | McFadden | 248/126 |
| 1,466,292 | 8/1923 | Bell | 248/58 |
| 2,920,150 | 1/1960 | Burroughs | 248/317 |
| 3,059,883 | 10/1962 | Matthiessen | 248/49 |
| 3,082,487 | 3/1963 | Fowler et al. | 52/484 |
| 3,112,909 | 12/1963 | Suozzo et al. | 248/58 |
| 3,288,406 | 11/1966 | Degen | 248/49 |
| 3,436,047 | 4/1969 | Foltz | 248/317 |
| 4,194,711 | 3/1980 | Winton | 248/49 |

FOREIGN PATENT DOCUMENTS

| | | | |
|---|---|---|---|
| 0097741 | 3/1924 | Austria | 248/75 |
| 0531897 | 8/1931 | Fed. Rep. of Germany | 248/58 |
| 7442097 | 7/1975 | Fed. Rep. of Germany | |

Primary Examiner—William H. Schultz
Assistant Examiner—Ramon O. Ramirez
Attorney, Agent, or Firm—Kenyon & Kenyon

[57] ABSTRACT

The suspension means engages with a substantially horizontal portion of the pipework which is located at a geodetic altitude which is considerably different from that of the clamped portion of the pipework. In one embodiment, the suspension means has a pair of links each of which is pivotally connected to one of two spaced apart positions of the horizontal pipework portion and a pendulum to which the links are connected in common. The pendulum is pivotally mounted on a ceiling or the like. During expansion of the pipework, the suspension means allows the horizontal pipework portion to rise so as to relieve stressing in the pipework. In other embodiments, pairs of links may be used or a wire cable can be used to suspend the horizontal pipework portion.

4 Claims, 4 Drawing Figures

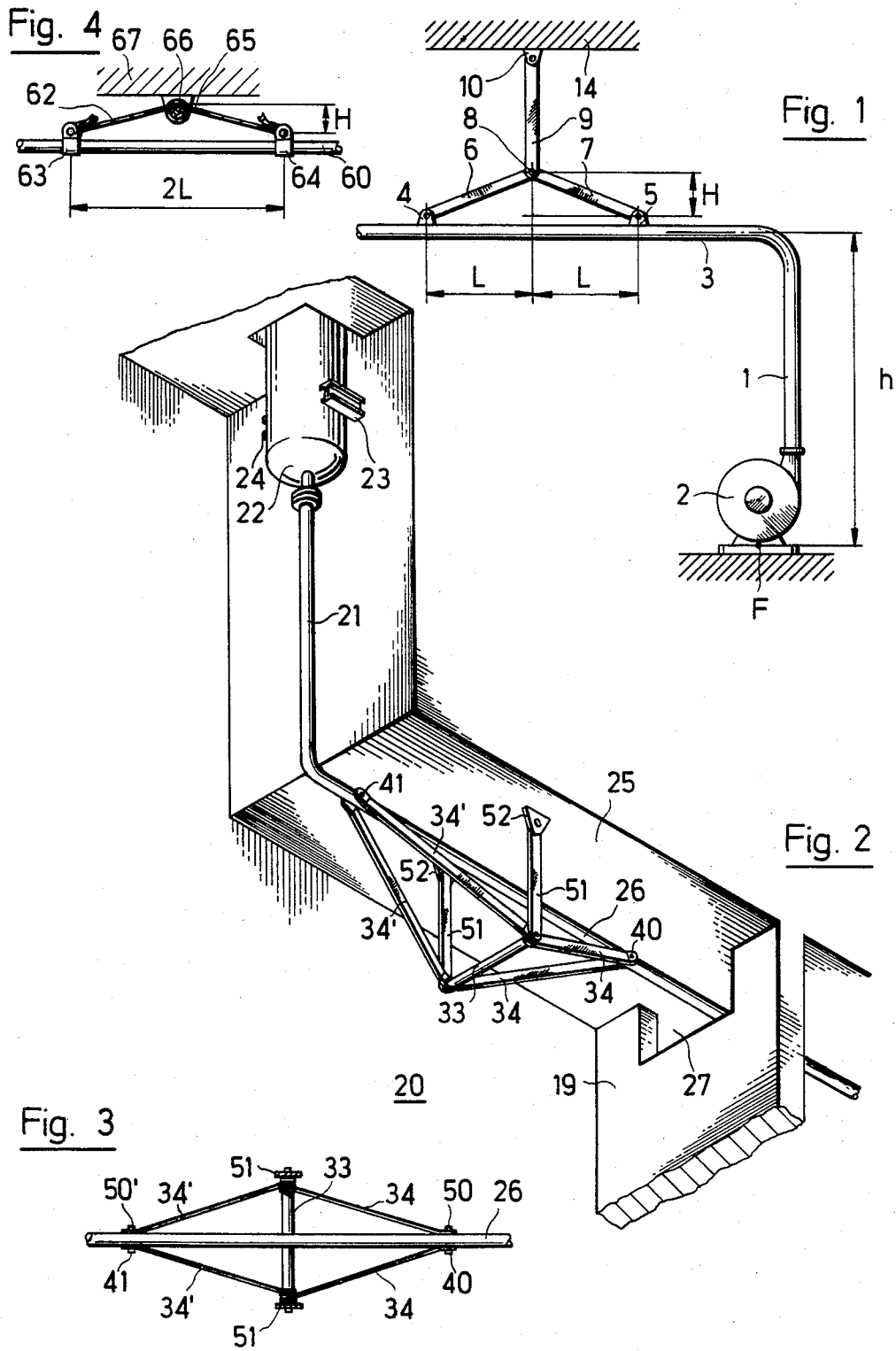

MEANS FOR SUSPENDING PIPEWORK

This invention relates to a means for suspending pipework. More particularly, this invention relates to a suspension system for a piping system.

Heretofore, various types of piping systems or pipework have been constructed so that a substantially horizontal portion is positioned at a geodetic altitude which is considerably different from that of a place where the pipe work is clamped. Further, in those cases where the pipework is subject to temperature variations, it has been known to suspend the pipework by way of the substantially horizontal portion, for example by means such as springs and constant hangers. However, springs have the disadvantage of being relatively long and of requiring adjustment if a number of springs are to support the weight of the pipework uniformly. Constant hangers have the disadvantage of being relatively expensive.

Accordingly, it is an object of the invention to provide a suspension system for a pipework which is relatively inexpensive.

It is another object of the invention to provide a suspension system for a pipework which is relatively short.

It is another object of the invention to provide a suspension system for a pipework which does not require adjustment.

It is another object of the invention to be able to support a pipework or piping system in a low-slung manner.

Briefly, the invention provides a pipework having a substantially horizontal portion and a means for suspending the pipework. This means includes a first means which is pivotally secured to the horizontal portion at two spaced apart positions of the horizontal portion and a second means which supports the first means at a mid-point thereof for suspension of the horizontal portion.

In one embodiment, the first means of the suspension means is embodied by a pair of links each of which is pivotally connected at one end to a respective position of the horizontal portion and to each other at an opposite end. In addition, the second means is in the form of a vertically disposed support member or pendulum which is pivotally connected to each link at the lower end. As compared with constant hangers and springs, this embodiment has the advantage of being relatively rigid. As such, the suspension system does not form an oscillatable system together with the mass of the pipework.

In another embodiment, wherein the clamping place of the pipework is located above the horizontal portion, the suspension means includes two pairs of links and a common bar connected at each end to an end of one link of each link pair. In addition, each pair of links is pivotally connected at an opposite end to a respective position of the horizontal portion. The suspension means also includes two parallel vertical support members each of which is pivotally connected to a respective end of the bar. In this construction, each pair of links and the common bar form a bar of rod triangle. When in position, the common bar is located below the plane of the horizontal portion of the pipework. In this case, it is not necessary to provide a lateral guiding of the pipework. Further, the vertical support member can be in the form of a suspended or standing pendulum which is pivotal axially of the horizontal portion of the pipework.

In still another embodiment, the suspension means is in the form of a cable which is connected at opposite ends to the respective positions of the horizontal pipework portion and a roller over which the cable is disposed. In this case, the roller can be supported from a ceiling in a suitable manner.

These and other objects and advantage of the invention will become more apparent from the following detailed description taken in conjunction with the accompanying drawings wherein:

FIG. 1 illustrates a view of a part of a pipework with a suspension means constructed in accordance with the invention;

FIG. 2 illustrates another pipework in combination with a modified suspension system according to the invention;

FIG. 3 illustrates a part plan view of the suspension means of FIG. 2; and

FIG. 4 illustrates a view of a further modified suspension means according to the invention.

Referring to FIG. 1, a pipework or piping system 1 includes a fixed portion in the form of a pump 2 which is secured at a fixed position F. In addition, the pipework includes a vertical portion which extends upwardly to a horizontal portion 3. As indicated, the horizontal portion 3 extends below a roof, ceiling or floor 14 and is disposed in a horizontal plane spaced from the position F over a height h.

As shown, a suspension means suspends the horizontal portion 3 from the ceiling 14. To this end, the horizontal portion 3 has a pair of lugs 4, 5 secured thereon at two spaced apart positions while the suspension means has a pair of links 6, 7 pivotally secured to the respective lugs 4, 5. In addition, the suspension means includes a vertically disposed support member in the form of a pendulum 9 which is pivotally secured to the links 6, 7 via a pivot pin 8. The support member 9 is pivotally mounted at the upper end in a lug 10 which is secured to the ceiling 14.

As indicated, the pivot pin 8 is located at a height H above the points of connection of the links 6, 7 to the lugs 4, 5. In addition, the pivot pin 8 and, thus, the support member 9 is located at the mid-point of the two links 6, 7. As indicated, the mid-point is disposed at a horizontal distance L from each of the lugs 4, 5.

When the part of the pipe work 1 which is illustrated is inoperative, the pipework 1 is at room temperature. However, during operation, the pipework 1 conveys a hot medium. As a result, as the pipework 1 heats up, the vertical portion expands so that the horizontal portion 3 rises. Simultaneously, the distance between the two lugs 4, 5 changes. However, the links 6, 7 do not alter their length since they remain at room temperature. Consequently, there is a reduction in the distance between the pivot 8 and the pipework 1 with the result that the horizontal portion 3 rises. This results in less stressing of the pipework 1.

The distance 2L between the pivot pins of the two lugs 4, 5 and the height H of the pivot pin 8 above the plane of the center lines of the pivot pins of the lugs 4, 5 are chosen so as to comply with the relationship $H = L^2/h$ where h denotes the geodetic difference in altitude between the horizontal portion 3 and the clamping position F. If this condition is complied with when the pipework experiences temperature changes, the pivot pin 8 moves relatively to the horizontal pipework portion 3 by exactly the same amount as the portion 3 moves vertically in relation to the position F. The pipework 1 does not therefore experience stresses due to the movement being impeded.

Referring to FIG. 2, the piping system 21 may be constructed with a heat exchanger 22 which is carried by two brackets 23, 24 which form a clamped or secured portion, a vertical portion which extends downwardly to a room 20 and a horizontal portion 26 which extends along a floor or ceiling 25. As shown, the horizontal portion 26 extends through a vertical opening 27 in a vertical wall 19 which bounds the room 20. In this case, the suspension means employs a common bar 33 and two pairs of links 34, 34'. As shown, each link 34 is pivotally connected to one position 40 of the horizontal portion 26 while each link 34' is pivotally connected to a second spaced-apart position 41 of the horizontal portion. In addition, each link 34, 34' is pivotally connected to a respective end of the common bar 33 to form two bar triangles. As indicated, the bar 33 is horizontally disposed and is formed as a cylindrical bar or rod.

The links 34, 34' are of equal length with each being made of flat metal stock which is bent slightly at the end. Each bent end is also formed with a bore to permit fitting over a pivot pin 50, 50' which is welded to each position 40, 41 (FIG. 3) on the pipework portion 26 on a horizontal axis. The links 34, 34' thus can be slid over the pins 50, 50', respectively with engagement being secured by means of split pins (not shown). The opposite ends of the links 34, 34' are pushed onto reduced diameter ends of the bar 33.

As shown, the bar 33 is supported in a pair of vertically disposed members in the form of pendulums 51. Each pendulum 51 has a bore at a lower end to receive a reduced diameter end of the bar 33 and is suspended at the upper end on a lug 52 which is secured to the ceiling 25.

In cases where the horizontal portion 26 extends just above a floor, the bar 33 could, conveniently, receive two rollers which could roll either on the floor or on rails supported on the floor.

The distance between the two positions 40 and 41, the length of the links 34, 34' and the length of the bar 33 are such that, in the event of a rising temperature in the piping system 21, the distance between the positions 40 and 41 increases but the horizontal portion 26 descends by the same amount as the vertical portion of the system 21 expands.

In the embodiments illustrated in FIGS. 1 to 3, the pendulum 9 and the pendulums 51 are in the form of flat iron members. Depending upon the amount of freedom required for the pipework 1, 21, the suspension position of the links 6, 7 and 34, 34' can be supported in the room in other ways, for example, rigidly or in parallel guides. Alternatively, the pendulums 9, 51 can be in the form of chains or wire cables. Also, instead of using links 6, 7, a slack wire cable which is guided from one lug 4 to the other lug 5 can be used.

Referring to FIG. 4, the horizontal portion 60 of a pipework 1 may alternatively be suspended by a wire cable 62 and a roller 65. As indicated, the wire cable 62 extends between two clips 63, 64 which are secured to the horizontal portion 60 and is disposed over the roller 65 at the mid point. As indicated, this suspension system provides a sag H.

The roller 65 is mounted so as to be rotatable about a stationary pivot 66 and is disposed half way along the length of the cable 62 at average temperature. The pivot 66 is, in turn, mounted in two lugs which are secured to a floor or ceiling or the like 67.

An axial movement of the horizontal portion 60 in response to a change in temperature of the pipework is too small as compared with the length 2 L to cause any appreciable change in the sag H.

Of note, this suspension 62, 65 has the advantage of not requiring a pendulum or pendulum support. Hence, the pipework can be placed closer to the ceiling 67 (or to a floor).

The invention thus provides a suspension system for supporting pipework from a floor or ceiling which is of relatively compact construction. Further, the suspension system is constructed so that adjustments are not required during expansion of the pipework due to a heated medium being conveyed through the pipework.

The suspension means obviates the need for the customary springs and constant hangers as well as their associated disadvantages. Further, the suspension means of FIGS. 1 to 3 being relatively rigid, do not tend to form an oscillatable system with the pipework.

What is claimed is:
1. In combination,
a piping system having a horizontal portion and a second portion fixed at a point in a horizontal plane vertically spaced from said horizontal portion;
a first means pivotally secured to said horizontal portion at two spaced apart positions of said horizontal portion, said first means including a pair of links, each link being pivotally connected at one end to a respective position of said horizontal portion and to each other at an opposite end; and
a vertically disposed support member pivotally connected to each link at said opposite ends thereof for supporting said first means at a mid-point of said first means for suspension of said horizontal portion.

2. The combination as set forth in claim 1 wherein said first means includes two pairs of links and a common bar connected at each end to an end of one link of each pair of links, each pair of links being pivotally connected at an opposite end to a respective position of said horizontal portion, and wherein said second means includes two parallel vertically disposed support members, each member being pivotally connected to a respective end of said bar.

3. The combination as set forth in claim 1 wherein said piping system includes a vertical portion between said second portion and said horizontal portion.

4. The combination as set forth in claim 1 wherein said horizontal portion is spaced from said horizontal plane over a height (h) and said positions of said horizontal portions are spaced apart a distance (2 L) and vertically spaced from said mid-point of said first means over a height (H) according to the relationship $H = L^2/h.$

* * * * *

UNITED STATES PATENT AND TRADEMARK OFFICE
CERTIFICATE OF CORRECTION

PATENT NO. : 4,516,750

DATED : May 14, 1985

INVENTOR(S) : Alfred Brunner

It is certified that error appears in the above-identified patent and that said Letters Patent is hereby corrected as shown below:

Column 1, line 64 change "bar of" to --bar or--

Column 2, line 9 change "advantage" to --advantages--

Column 4, line 59 change "(2 L)" to --(2L)--

Signed and Sealed this

Fifth Day of November 1985

[SEAL]

Attest:

DONALD J. QUIGG

Attesting Officer

Commissioner of Patents and Trademarks